United States Patent
Schmidt et al.

(10) Patent No.: US 11,940,032 B2
(45) Date of Patent: Mar. 26, 2024

(54) DAMPING DEVICE FOR DAMPING SHAFT VIBRATION

(71) Applicant: General Electric Company, Schenectady, NY (US)

(72) Inventors: Richard Schmidt, Loveland, OH (US); Bugra Han Ertas, Niskayuna, NY (US); Weize Kang, Mason, OH (US)

(73) Assignee: General Electric Company, Schenectady, NY (US)

( * ) Notice: Subject to any disclaimer, the term of this patent is extended or adjusted under 35 U.S.C. 154(b) by 1419 days.

(21) Appl. No.: 16/103,314

(22) Filed: Aug. 14, 2018

(65) Prior Publication Data

US 2020/0056677 A1 Feb. 20, 2020

(51) Int. Cl.
  *F16F 15/16* (2006.01)
  *F01D 25/16* (2006.01)

(52) U.S. Cl.
  CPC .......... *F16F 15/16* (2013.01); *F01D 25/164* (2013.01); *F16C 2360/23* (2013.01)

(58) Field of Classification Search
  CPC ...... F16F 15/161; F16F 15/162; F16F 15/165; F16F 15/167; F16F 15/173; F01D 25/04; F01D 25/06; F01D 25/164
  See application file for complete search history.

(56) References Cited

U.S. PATENT DOCUMENTS

| | | | |
|---|---|---|---|
| 4,200,003 A * | 4/1980 | Miller | F16F 15/167 188/267.2 |
| 4,492,245 A | 1/1985 | Sjolund | |
| 5,816,372 A * | 10/1998 | Carlson | A63B 21/00845 188/290 |
| 7,517,152 B1 | 4/2009 | Walsh | |
| 8,167,494 B2 | 5/2012 | Gibbons | |
| 8,206,039 B2 | 6/2012 | Maier | |
| 8,439,637 B2 | 5/2013 | DiBenedetto et al. | |
| 8,529,197 B1 | 9/2013 | Coffin et al. | |
| 9,739,170 B2 | 8/2017 | Ertas | |
| 9,879,720 B2 | 1/2018 | Ertas et al. | |
| 9,890,810 B2 | 2/2018 | Kawashita et al. | |
| 9,926,975 B2 | 3/2018 | Smedresman et al. | |
| 10,107,378 B2 | 10/2018 | Miller et al. | |
| 10,724,375 B2 | 7/2020 | Prescott et al. | |
| 2013/0051982 A1 | 2/2013 | Hindle et al. | |
| 2017/0023021 A1 | 1/2017 | Ogata et al. | |
| 2017/0248033 A1 | 8/2017 | Moniz et al. | |
| 2017/0298752 A1 | 10/2017 | Mook et al. | |

* cited by examiner

*Primary Examiner* — Topaz L. Elliott
*Assistant Examiner* — Ryan C Clark
(74) *Attorney, Agent, or Firm* — Dority & Manning, P.A.

(57) ABSTRACT

A damping device that includes features for damping bending vibration of a shaft rotating about its axis of rotation and methods for damping bending vibration utilizing the damping device are provided. In one exemplary aspect, the damping device includes a damping disc operatively coupled with a shaft, e.g., of a turbine engine or shaft system. The damping disc is at least partially received within a chamber defined by a housing. The chamber of the housing is configured to receive a damping fluid. When the shaft is rotated about its axis of rotation, the damping disc is movable within the chamber to move the damping fluid such that the damping fluid absorbs bending vibration emitted by the shaft. The damping fluid moved by the damping disc dampens bending vibration emitted by the shaft.

16 Claims, 7 Drawing Sheets

DAMPING DEVICE FOR DAMPING SHAFT VIBRATION

FIELD

The present subject matter relates generally to damping devices for damping shaft vibration.

BACKGROUND

Many turbine engines contain Squeeze Film Damper (SFD) devices that dampen radial vibration caused by the relative radial motion between the rotor and support structure. SFDs are typically mounted around one or more of the rotor bearings. Placement of SFDs at the rotor bearings may result in rotor bending mode shapes, and thus, some engine architectures have a nodal point (relatively small radial motion) at the bearing location. The ability to create effective damping relies on the degree of relative radial motion at the bearing location, which in turn relies on the nature of the rotor bending mode. Accordingly, many conventional radial SFDs are ineffective at damping or absorbing energy in the bending direction. Ineffective damping in the bending direction may lead to rotor instability, degraded engine performance, and damage to components. Relatively long rotor shafts are particularly vulnerable to rotor instability due to vibration in the bending direction.

Accordingly, a damping device that addresses one or more of the challenges noted above would be useful. In particular, a damping device that includes features for damping rotor vibration of turbomachines in the radial and bending directions would be desirable.

BRIEF DESCRIPTION

Exemplary aspects of the present disclosure are directed to methods and systems for mitigating the effect of shaft vibration in the shaft bending direction. Aspects and advantages of the invention will be set forth in part in the following description, or may be obvious from the description, or may be learned through practice of the invention.

In one exemplary aspect, the present disclosure is directed to a turbomachine. The turbomachine includes a shaft rotatable about an axis of rotation. The turbomachine also includes a support structure. The turbomachine further includes a damping device positioned between the support structure and the shaft. The damping device includes a bearing operatively coupled with the shaft. The damping device also includes a housing defining a chamber configured to receive a damping fluid. Further, the damping device includes a damping disc operatively coupled with the bearing and at least partially received within the chamber, wherein the damping disc is movable within the chamber to move the damping fluid such that the damping fluid absorbs bending vibration emitted by the shaft.

In another exemplary aspect, the present disclosure is directed to a method for damping bending vibration of a shaft. The method includes rotating the shaft about an axis of rotation. Further, the method includes damping, via a damping device, bending vibration of the shaft, wherein the damping device comprises a housing defining a chamber configured to receive a damping fluid and a damping disc operatively coupled with the shaft and at least partially received within the chamber, wherein the damping disc is movable within the chamber to move the damping fluid such that the damping fluid absorbs energy due to bending vibration emitted by the shaft.

In a further exemplary aspect, the present disclosure is directed to a damping device for damping bending vibration of a shaft rotatable about an axis of rotation. The damping device is coupled with a support structure. The damping device includes a housing defining a chamber configured to receive a damping fluid. Further, the damping device includes a damping disc operatively coupled with the shaft and at least partially received within the chamber, wherein the damping disc is configured to wobble within the chamber to move the damping fluid along a direction substantially parallel to the axis of rotation for damping bending vibration of the shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
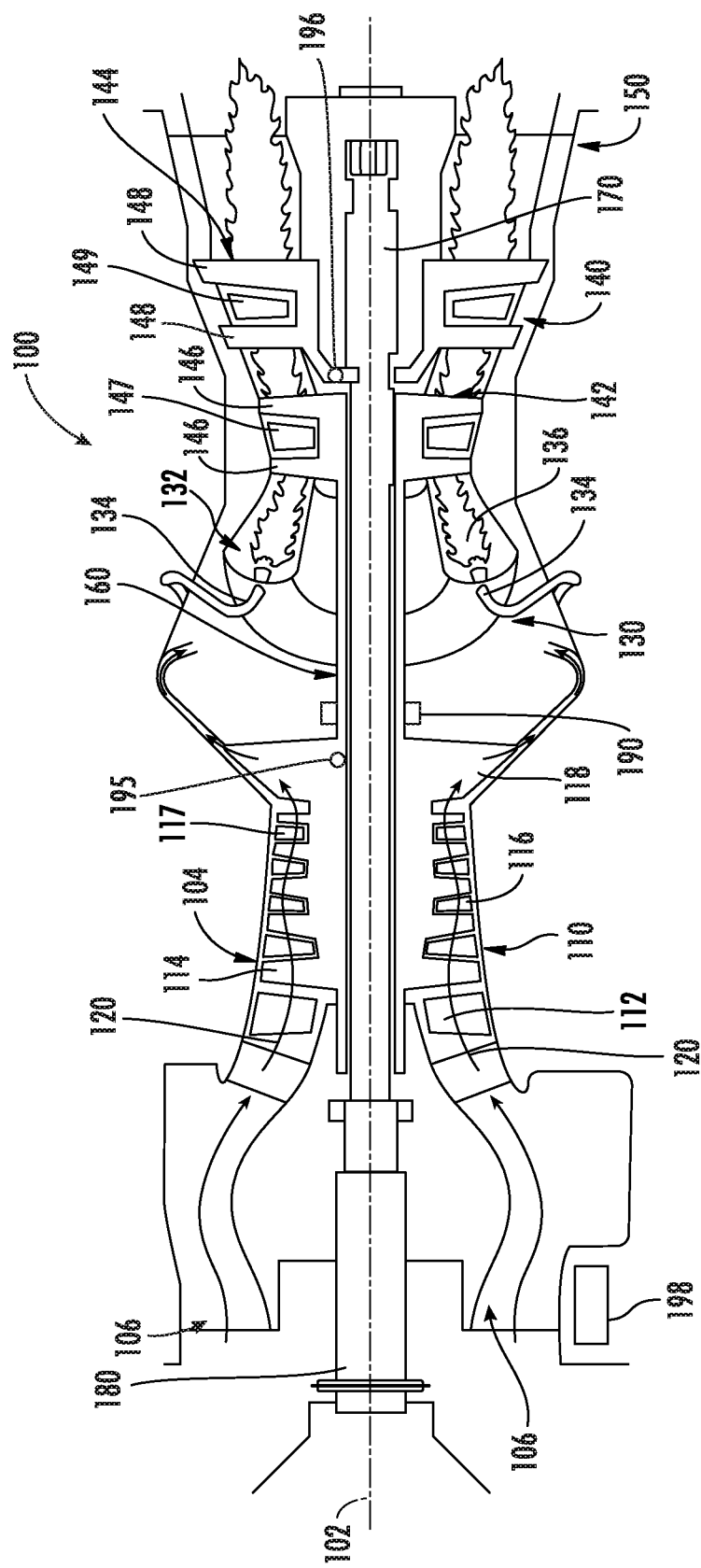
FIG. 1 provides a schematic cross-sectional view of an exemplary gas turbine engine according to an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Exemplary aspects of the present disclosure are directed to a damping device, e.g., of a turbomachine, that includes features for damping bending vibration of a shaft rotating about its axis of rotation. Methods for damping bending vibration utilizing the damping device are also provided. In one exemplary aspect, the damping device includes a damping disc operatively coupled with a shaft, e.g., of a turbine engine or shaft system. The damping disc may be directly coupled with the shaft or a bearing may operatively couple the damping disc with the shaft. The damping disc is at least partially received within a chamber defined by a housing. The housing is attached or otherwise connected to a static support structure. The chamber of the housing is configured to receive a damping fluid, such as e.g., oil or some other compressible fluid. In some instances, when the shaft is rotated about an axis of rotation, the shaft may assume an undesirable bending mode shape. To dampen the vibration causing the undesirable mode shape, the damping disc is movable within the chamber to move the damping fluid so that the damping fluid absorbs the energy. Particularly, the damping disc may wobble within the chamber to squeeze and expand the damping fluid such that the damping fluid absorbs the bending vibration emitted by the shaft. The damping fluid moved by the damping disc may be squeezed against the walls defining the chamber, squeezed through various squeeze ports, etc. to absorb the vibration transmitted to the damping disc. In this way, the damping device dampens bending vibration emitted by the shaft.

FIG. 1 provides a schematic cross-sectional view of an exemplary gas turbine engine 100 according to an exemplary embodiment of the present disclosure. As shown, the gas turbine engine 100 defines a longitudinal or centerline axis 102. The gas turbine engine 100 includes a substantially tubular outer casing 104 that defines an annular inlet 106. The outer casing 104 may be formed from a single casing or multiple casings. The outer casing 104 encloses, in serial flow relationship, a compressor 110, a combustion section 130, a turbine 140, and an exhaust section 150. The compressor 110 includes an annular array of inlet guide vanes 112, one or more sequential arrays of compressor blades 114, one or more sequential arrays of variable stator vanes 116, one or more sequential arrays of stationary compressor vanes 117, and an impeller or centrifugal compressor 118. Collectively, the compressor blades 114, variable stator vanes 116, stationary compressor vanes 117, and the centrifugal compressor 118 define a compressed air path 120.

The combustion section 130 includes a combustor that defines a combustion chamber 132. The combustion section 130 also includes one or more fuel nozzles 134 extending into the combustion chamber 132. The fuel nozzles 134 supply fuel to mix with compressed air entering the combustion chamber 132. The mixture of fuel and compressed air combusts within the combustion chamber 132 to form combustion gases 136. The combustion gases 136 drive both the compressor 110 and the turbine 140 as described below.

The turbine 140 includes a gas generator turbine 142 and a power turbine 144. The gas generator turbine 142 includes one or more sequential arrays of turbine rotor blades 146 and one or more sequential arrays of stator vanes 147. Likewise, the power turbine 144 includes one or more sequential arrays of turbine rotor blades 148 and one or more sequential arrays of stator vanes 149. As will be discussed below in more detail, the gas generator turbine 142 drives the compressor 110 via a gas generator shaft 160 and the power turbine 144 drives an output shaft 180 via a power shaft 170.

As shown in the embodiment illustrated in FIG. 1, the compressor 110 and the gas generator turbine 142 are operatively coupled to one another via the gas generator shaft 160. In operation, the combustion gases 136 drive both the gas generator turbine 142 and the power turbine 144. As the gas generator turbine 142 rotates around the centerline axis 102, the gas generator shaft 160 rotates about the centerline axis 102, which in turn drives the compressor 110. Further, as the power turbine 144 rotates, the power shaft 170 rotates and transfers rotational energy to the output shaft 180. As further provided in FIG. 1, the gas turbine engine 100 includes a shaft bearing assembly 190 supporting the gas generator shaft 160 and the power shaft 170. The shaft bearing assembly 190 may be disposed within a sump. Although only one shaft bearing assembly is shown in FIG. 1, it will be appreciated that the gas turbine engine 100 may include other shaft bearing assemblies supporting one or both of the gas generator shaft 160 and the power shaft 170.

As further shown in FIG. 1, the gas turbine engine 100 includes one or more sensors positioned within or along the gas turbine engine 100. As shown, for this embodiment, the gas turbine engine 100 includes a gas generator shaft sensor 195 positioned proximate the gas generator shaft 160 for sensing shaft state data of the gas generator shaft, such as e.g., shaft speed, shaft vibration, etc. In addition, the gas turbine engine 100 also includes a power shaft sensor 196 positioned proximate the power shaft 170 for sensing shaft state data of the power shaft 170, such as e.g., shaft speed, shaft vibration, etc. As will be explained in detail herein, the shaft state of the gas generator shaft 160 and/or the power shaft 170 may be utilized to determine a mode shape of the shaft during operation of the gas turbine engine 100, which may in turn be used to adjust a damping response to the shaft vibration.

The gas turbine engine 100 also includes one or more engine controllers 198 configured to control the engine (only one shown in FIG. 1). The engine controller 198 can be, for example, an Electronic Engine Controller (EEC) or a Digital Engine Controller (DEC) equipped with Full Authority Digital Engine Control (FADEC). The engine controller 198 can include one or more processor(s) and one or more memory device(s). The one or more processor(s) can include any suitable processing device, such as a microprocessor, microcontroller, integrated circuit, logic device, and/or other suitable processing device. The one or more memory device(s) can include one or more computer-readable media, including, but not limited to, non-transitory computer-readable media, RAM, ROM, hard drives, flash drives, and/or other memory devices. The one or more memory device(s) can store information accessible by the one or more processor(s), including computer-readable instructions that can be executed by the one or more processor(s). The instructions can be any set of instructions that when executed by the one or more processor(s), cause the one or more processor(s) to perform operations, such as any of the operations and functions for which the engine controller 198 is configured, such as e.g., operations for determining a mode shape of one or more shafts of the engine based on shaft state data, and based on the mode shape, controlling various features to control the damping response to the vibration of the shaft. The instructions can be software written in any suitable programming language or can be implemented in hardware. Additionally, and/or alternatively, the instructions can be executed in logically and/or virtually separate threads on processor(s).

The memory device(s) can further store data that can be accessed by the one or more processor(s). For example, the data can include mode shape models, formulas, look-up tables, etc. that can be used to calculate mode shapes based on shaft state data. The data can also include other data sets, parameters, outputs, information, etc. shown and/or described herein. The engine controller 198 can also include a communication interface for communicating, for example, with the other components of the gas turbine engine or systems in communication with the engine. The communication interface can include any suitable components for interfacing with one or more network(s) or electronic components, including for example, transmitters, receivers, ports, controllers, antennas, and/or other suitable components. Communication interface can be used to communicate with other electronic devices over one or more networks, such as e.g., a local area network (LAN), a wide area network (WAN), SATCOM network, VHF network, a HF network, a Wi-Fi network, a WiMAX network, a gatelink network, and/or any other suitable communications networks. The communication interface can communicate over one or more networks using a wide variety of communication protocols. The communication interface can include a data bus or a combination of wired and/or wireless communication links that communicatively couple the engine controller 198 with other electronic devices.

Although the gas turbine engine of FIG. 1 is depicted in a turboshaft configuration, it will be appreciated that the teachings of the present disclosure can apply to other types of turbine engines, turbomachines more generally, and other shaft systems. For example, the turbine engine may be another suitable type of gas turbine engine, such as e.g., a turboprop, turbojet, turbofan, aeroderivatives, etc. The present disclosure is also applicable to other types of turbomachinery, such as e.g., steam turbine engines and centrifugal pumps. The present disclosure is further applicable to other types of shaft systems, such as e.g., a tail rotor drive shaft of a rotary vehicle, such as e.g., a helicopter.

Figure 2:
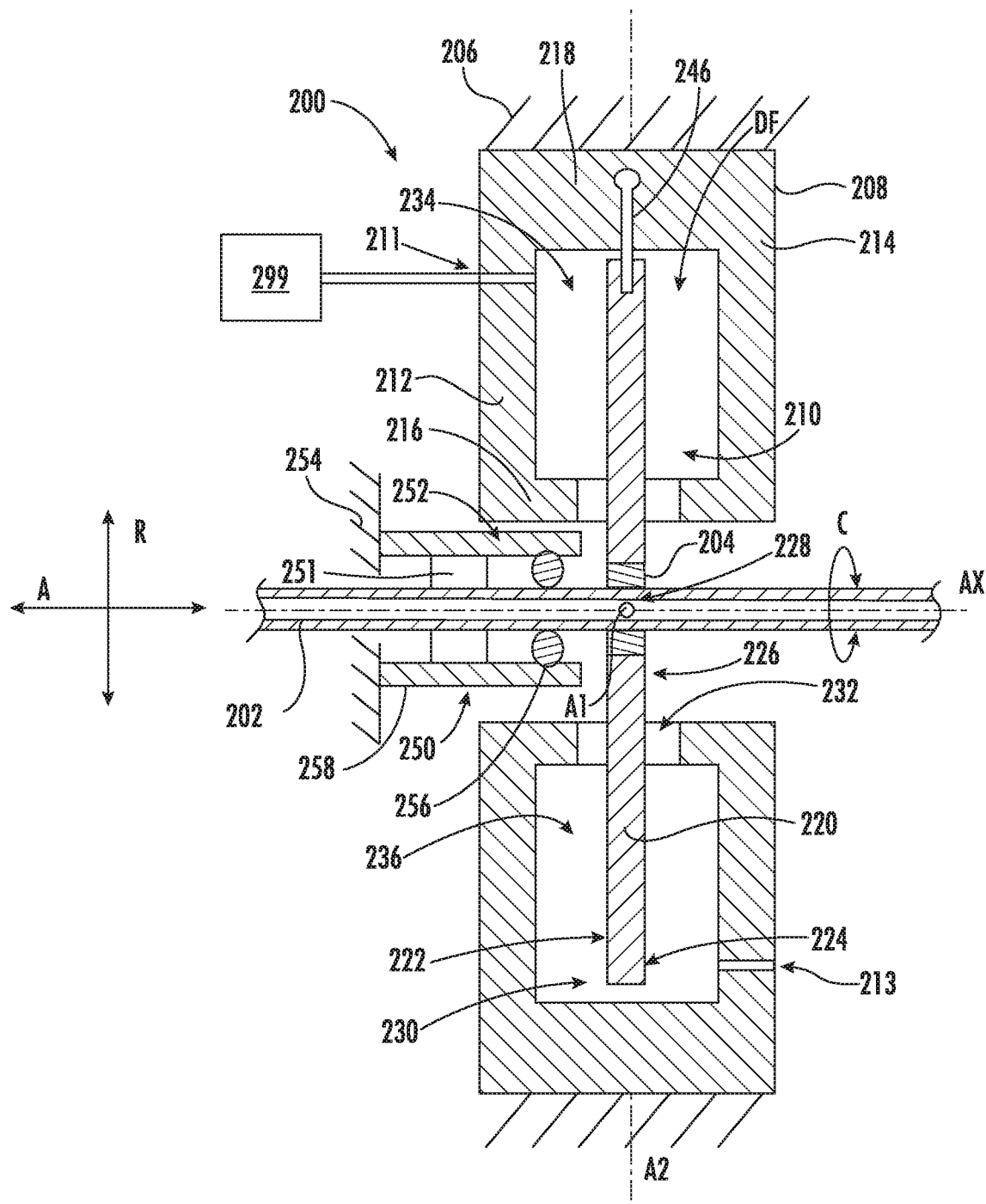
FIG. 2 provides a schematic view of an exemplary damping device in accordance with one exemplary embodiment of the present disclosure.

FIG. 2 provides a schematic cross sectional view of an exemplary annular damping device 200 in accordance with one exemplary embodiment of the present disclosure. The damping device 200 of FIG. 2 can be used for damping shaft vibration of one of more shafts of any suitable turbomachine, drive system, or any suitable shaft system. As one example, the damping device 200 of FIG. 2 may be operatively configured to damp the shaft vibration of one or more of the shafts of the gas turbine engine 100 of FIG. 1. As another example, the damping device 200 of FIG. 2 may be operatively configured to damp shaft vibration of a drive shaft of a transmission system, such as e.g., a tail rotor drive shaft of a rotary aerial vehicle. Other applications are possible.

As shown in FIG. 2, The damping device 200 defines an axial direction A, a radial direction R, and a circumferential direction C. A shaft 202 extends through the damping device 200 and is rotatable about an axis of rotation AX. The axial direction A extends parallel with the axis of rotation AX, the radial direction R extends to and from the axis of rotation AX in a direction orthogonal to the axial direction A, and the circumferential direction C extends three hundred sixty degrees (360°) about the axis of rotation AX. Further, the damping device 200 includes a bearing 204 rotatably coupling the shaft 202 with a damping disc 220. The bearing 204 prevents the damping disc 220 from rotating about the axis of rotation AX while the shaft 202 rotates. However, due to friction in the bearing 204, tangential forces from the bearing 204 may tend to spin the damping disc 220. Thus, as will be explained below, the damping device 200 may include an anti-rotation device 246. Moreover, as shown, the damping device 200 is positioned between a support structure 206 and the bearing 204, e.g., along the radial direction R. Particularly, the damping device 200 extends annularly about the shaft 202 and the bearing 204. The support structure may be any suitable structure, such as e.g., a strut or a casing.

As depicted in FIG. 2, the damping device 200 includes an annular housing 208 defining a chamber 210 configured to receive a damping fluid DF, such as e.g., oil. The damping fluid DF may be circulated though the chamber 210 via a circulation system 299 during operation, e.g., to introduce relatively cool damping fluid to the chamber 210 and remove relatively hot damping fluid from the chamber 210. For instance, relatively cool damping fluid may enter the chamber 210 through an inlet port 211 and may exit the chamber 210 though an outlet port 213. The housing 208 extends annularly about the shaft 202 and the bearing 204, and similarly, the chamber 210 extends annularly about the shaft 202 and the bearing 204 as well. More particularly, the housing 208 extends between a first wall 212 and a second wall 214 opposing the first wall 212, e.g., along the axial direction A. The first and second walls 212, 214 are oriented generally in a plane orthogonal to the axial direction A. Moreover, the first and second walls 212, 214 are connected by an inner wall 216 and an outer wall 218 spaced from the inner wall 216, e.g., along the radial direction R. The outer wall 218 is connected to the support structure 206. The first and second walls 212, 214 and the inner and outer walls 216, 218 collectively define the chamber 210.

The damping device 200 also includes annular damping disc 220. The damping disc 220 has a thickness T defined between a first face 222 and a second face 224 opposing the first face 222, e.g., along the axial direction A. The damping disc 220 is operatively coupled with the bearing 204. Specifically, the damping disc 220 has a hub portion 226 that defines a pass-through aperture 228 through which the shaft 202 extends. The bearing 204 is also disposed within the pass-through aperture 228. The damping disc 220 extends outward from the hub portion 226 to an outer periphery 230, e.g., along the radial direction R. Notably, the damping disc 220 is at least partially received within the chamber 210 as shown in FIG. 2. Specifically, the damping disc 220 extends from the hub portion 226 through an annular opening 232 defined by the inner wall 216 and into the chamber 210. One or more sealing elements (not shown) may seal the inner wall 216 with the damping disc 220 to prevent damping fluid DF from exiting the chamber 210.

Generally, the bending vibrations emitted by the shaft 202 cause the shaft 202 to assume a bending mode shape, which may an undesirable mode shape. Thus, in accordance with exemplary aspects of the present disclosure, the damping disc 220 is configured to "wobble" within the chamber 210 to mitigate bending vibration emitted by the shaft 202. For instance, the damping disc 220 may wobble in a similar manner to how a coin wobbles on a flat or slightly concave surface. More particularly, as shown in FIG. 2, the damping device 200 defines a first axis A1 and a second axis A2. The first axis A1 is orthogonal to the axis of rotation AX and the second axis A2 is orthogonal to the first axis A1 and the axis of rotation AX. From the perspective of FIG. 2, the first axis A1 extends into and out of the page and the second axis A2 extends vertically. However, as damping device 200 is an annular configuration, it will be appreciated that the first axis A1 and the second axis A2 may each extend in a plane orthogonal to the axis of rotation perpendicular to one another in any suitable orientation. When damping disc 220 wobbles within the chamber 210, the damping disc 220 wobbles about the first axis A1 orthogonal to the axis of rotation AX and the second axis A2 orthogonal to the first axis A1 and the axis of rotation AX. When the damping disc 220 wobbles within the chamber 210, the damping device 200 dampens the bending vibration emitted by the shaft 202 as will be explained further below.

Particularly, as the damping disc 220 wobbles within the chamber 210, the damping disc 220 compresses or squeezes the damping fluid DF substantially along a direction parallel to the axis of rotation AX for damping bending vibration of the shaft 202. In this example, the direction parallel to the axis of rotation AX is the axial direction A. That is, when the damping disc 220 wobbles to a first wobble position, the damping fluid DF within the chamber 210 is squeezed or compressed between the second face 224 of the damping disc 220 and the second wall 214, and radially opposite, the damping fluid DF within the chamber 210 is squeezed or compressed between the first face 222 of the damping disc 220 and the first wall 212. After wobbling to the opposite orientation, or a second wobble position, the damping fluid DF within the chamber 210 is compressed between the first face 222 of the damping disc 220 and the first wall 212, and radially opposite, the damping fluid DF within the chamber 210 is squeezed or compressed between the second face 224 of the damping disc 220 and the second wall 214. The damping fluid DF absorbs the bending vibrations when it is compressed or squeezed.

As further shown in FIG. 2, the damping device 200 includes an anti-rotation device 246. The anti-rotation device 246 operatively couples the damping disc 220 with at least one of the housing 208 and the support structure 206. For this embodiment, the anti-rotation device 246 is operatively coupled to the housing 208, and more particularly, to the outer wall 218 of the housing 208. The anti-rotation device 246 is configured to constrain a range of motion of the damping disc 220 within the chamber 210. Particularly, the anti-rotation device 246 constrains the range of motion of the damping disc 220 about the axis of rotation AX. Thus, the anti-rotation device 246 constrains the spinning movement of the damping disc 220 invoked by tangential friction forces originating from bearing 204. In this way, for this embodiment, the damping disc 220 wobbles about the first axis A1 and the second axis A2 but does not spin about the axis of rotation AX.

The damping device 200 also includes a radial support assembly 250 configured to constrain radial deflection of the shaft 202. Limiting radial deflection allows tighter clearances between the damping disc 220 and the outer wall 218. As shown in FIG. 2, the radial support assembly 250 includes an annular shaft bearing assembly 252 operatively coupling the shaft 202 to a support structure 254, which may be the same as or different than the support structure 206. The shaft bearing assembly 252 includes a bearing element 256 (e.g., a plurality of spherical balls) and a coupling arm 258 coupling an outer race of the shaft bearing assembly 252 to the support structure 254. The shaft bearing assembly 252 supports the shaft 202. For instance, the shaft bearing assembly 252 may be the bearing 190 of FIG. 1. In addition to bending vibration (depicted in FIG. 3), shaft vibrations will also incur radial motion (along the radial direction R) due to imbalance. To mitigate the radial motion, shaft bearing assembly 252 is placed in close proximity to the damping disc 220. In some embodiments, the radial support assembly 250 also includes a radial damping assembly 251 (shown schematically in FIG. 2) for mitigating radial vibration. For instance, the radial damping assembly 251 may be a radial squeeze film damper. Thus, in such embodiments, the damping device 200 may mitigate radial vibration (via the radial damping assembly 251) and bending vibration (via the damping disc 220 and damping fluid).

Figure 3:
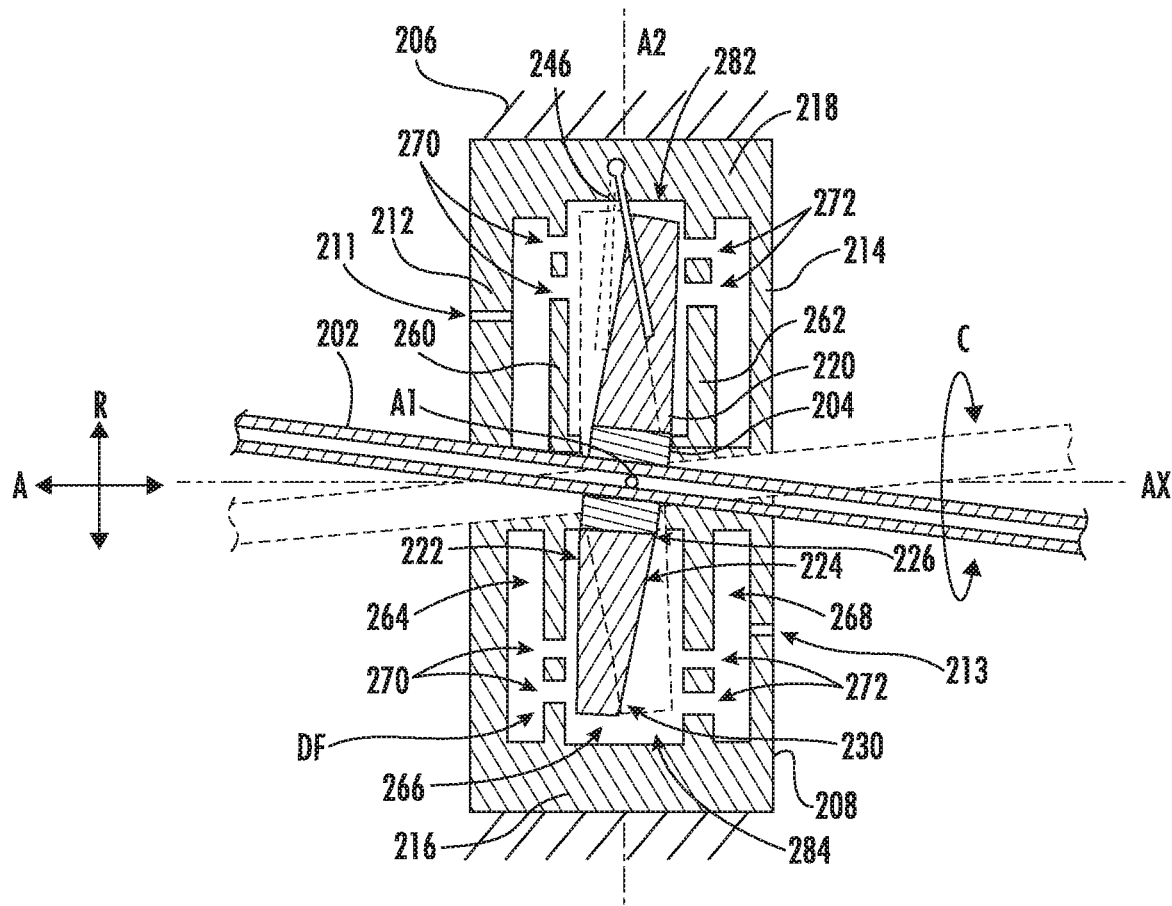
FIG. 3 provides a schematic view of another exemplary damping device in accordance with an exemplary embodiment of the present disclosure.

FIG. 3 provides a schematic view of another exemplary damping device 200 in accordance with an exemplary embodiment of the present disclosure. The exemplary damping device 200 of FIG. 3 is configured in a similar manner as the damping device of FIG. 2, and accordingly, the same or similar reference numerals refer to the same or similar parts. In contrast with the damping device of FIG. 2, the damping device 200 of FIG. 3 dampens bending vibration by moving damping fluid DF through squeeze ports defined by partition walls that partition the main chamber as explained more fully below.

As shown in FIG. 3, the housing 208 includes a first partition wall 260 positioned between the first wall 212 and the first face 222 of the damping disc 220. The first partition wall 260 extends between and connects the inner wall 216 and the outer wall 218. The housing 208 also includes a second partition wall 262 positioned between the second wall 214 and the second face 224 of the damping disc 220. The second partition wall 262 extends between and connects the inner wall 216 and the outer wall 218. A first chamber 264 is defined between the first wall 212 and the first partition wall 260. That is, the first wall 212, first partition wall 260, the inner wall 216, and the outer wall 218 define the first chamber 264. A main chamber 266 is defined between the first partition wall 260 and the second partition wall 262. That is, the first partition wall 260, the second partition wall 262, the inner wall 216, and the outer wall 218 define the main chamber 266. The main chamber 266 extends between a first end 282 and a second end 284, e.g., along the radial direction R. A second chamber 268 is defined between the second partition wall 262 and the second wall 214. That is, the second partition wall 262, the second wall 214, the inner wall 216, and the outer wall 218 define the second chamber 268. The first chamber 264 is in fluid communication with the main chamber 266 and the second chamber 268 is in fluid communication with the main chamber 266.

More particularly, as shown in FIG. 3, the first partition wall 260 defines a plurality of squeeze ports 270 circumferentially spaced from one another about the axis of rotation AX. The plurality of squeeze ports 270 defined by the first partition wall 260 provide fluid communication between the first chamber 264 and the main chamber 266. Similarly, the second partition wall 262 defines a plurality of squeeze ports 272 circumferentially spaced from one another about the axis of rotation AX. The plurality of squeeze ports 272 defined by the second partition wall 262 provide fluid communication between the second chamber 268 and the main chamber 266.

Figure 4:
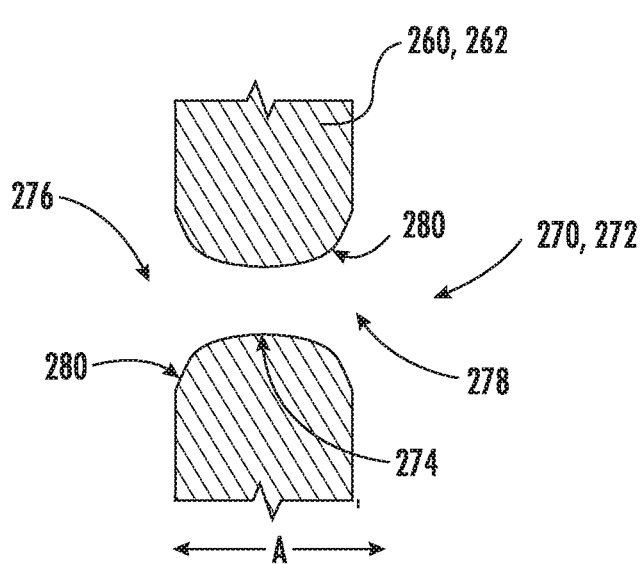
FIG. 4 provides a close up view of one exemplary squeeze port defined by a partition wall of a housing of a damping device in accordance with an exemplary embodiment of the present disclosure.

In some embodiments, the squeeze ports 270, 272 extend through their respective first and second partition walls 260, 262 having a constant diameter (e.g., where the squeeze ports are circular openings) or height (e.g., where the squeeze ports are some other shape, such as rectangles). In some embodiments, as shown in FIG. 4, at least one of the plurality of squeeze ports 270 defined by the first partition wall 260 or at least one of the plurality of squeeze ports 272 defined by the second partition wall 262 are defined as a Venturi nozzle 274. That is, the squeeze port has a constricted section relative to a first end 276 and a second end 278 of the port. With a port having a Venturi nozzle 274 configuration, as the damping disc 220 wobbles, the damping fluid DF may be accelerated into the first chamber 264 or second chamber 268 depending on the wobble orientation thereby more efficiently compressing the damping fluid DF. Further, in some embodiments, the first end 276 and second end 278 of the ports 270, 272 may include radiused or rounded corners 280. Such rounded corners 280 may facilitate damping fluid DF through the port, prevent turbulent flow within the chambers, and ultimately facilitate more efficient fluid dynamics of the damping fluid DF.

As further shown in FIG. 3, the damping disc 220 of FIG. 3 has a different configuration than the damping disc of FIG. 2. In particular, for this embodiment, the thickness of the damping disc 220 is variable as it extends outward from its hub portion 226 to the outer periphery 230. That is, as the damping disc extends radially outward from the hub portion 226 to the outer periphery 230, the thickness T of the damping disc 220 gradually changes from the hub portion 226 to the outer periphery 230. Such a configuration facilitates movement of the damping fluid DF toward the outer periphery 230 of the damping disc 220 such that the damping disc 220 may pass the damping fluid DF through the squeeze ports 270, 272 as it wobbles within the main chamber 266. The geometry of the damping disc 220 of FIG. 3 also allows for a greater range of wobble motion.

For this embodiment, as the damping disc 220 wobbles between various wobble positions (e.g., between a first position shown in phantom lines and a second position shown in solid lines in FIG. 3) within the main chamber 266, the damping disc 220 moves the damping fluid DF substantially along a direction parallel to the axis of rotation AX for damping bending vibration of the shaft 202. In this example, the direction parallel to the axis of rotation AX is the axial direction A. More particularly, when the damping disc 220 wobbles to the first position as viewed from the perspective of FIG. 3, the damping fluid DF within the main chamber 266 is moved substantially along a direction parallel to the axis of rotation AX causing some of the damping fluid DF to pass or squeeze through the squeeze ports 272 at the first end 282 of the main chamber 266. The damping fluid DF that is squeezed through the squeeze ports 272 at the first end 282 flows into the second chamber 268 where it is compressed therein. Further, when the damping disc 220 wobbles to the first position as viewed from the perspective of FIG. 3, the damping fluid DF within the main chamber 266 is moved substantially along a direction parallel to the axis of rotation AX causing some of the damping fluid DF to pass or squeeze through the squeeze ports 270 at the second end 284 of the main chamber 266. The damping fluid DF that is squeezed through the squeeze ports 270 at the second end 284 flows into the first chamber 264 where it is compressed therein.

Similarly, when the damping disc 220 wobbles to the second position as viewed from the perspective of FIG. 3, the damping fluid DF within the main chamber 266 is moved substantially along a direction parallel to the axis of rotation AX causing some of the damping fluid DF to pass or squeeze through the squeeze ports 270 at the first end 282 of the main chamber 266. The damping fluid DF that is squeezed through the squeeze ports 270 at the first end 282 flows into the first chamber 264 where it is compressed therein. Further, when the damping disc 220 wobbles to the second position as viewed from the perspective of FIG. 3, the damping fluid DF within the main chamber 266 is moved substantially along a direction parallel to the axis of rotation AX causing some of the damping fluid DF to pass or squeeze through the squeeze ports 272 at the second end 284 of the main chamber 266. The damping fluid DF that is squeezed through the squeeze ports 272 at the second end 284 flows into the second chamber 268 where it is compressed therein. Accordingly, as the damping disc 220 wobbles within the main chamber 266, the energy due to bending vibration transmitted from the shaft 202 to the bearing 204 and to the damping disc 220 is absorbed by the damping fluid DF moved substantially along a direction parallel to the axis of rotation AX by the damping disc 220 and squeezed through the squeeze ports 270, 272. Consequently, the damping device 200 dampens the bending vibration emitted by the shaft 202. As further shown in FIG. 3, anti-rotation device 246 may constrain the spinning movement of the damping disc 220 about the axis of rotation AX invoked by tangential friction forces originating from the bearing 204. Further, although not shown, the damping device 200 may include other features not shown in FIG. 3, such as e.g., the radial support assembly 250 and the radial damping assembly 251.

Figure 5:
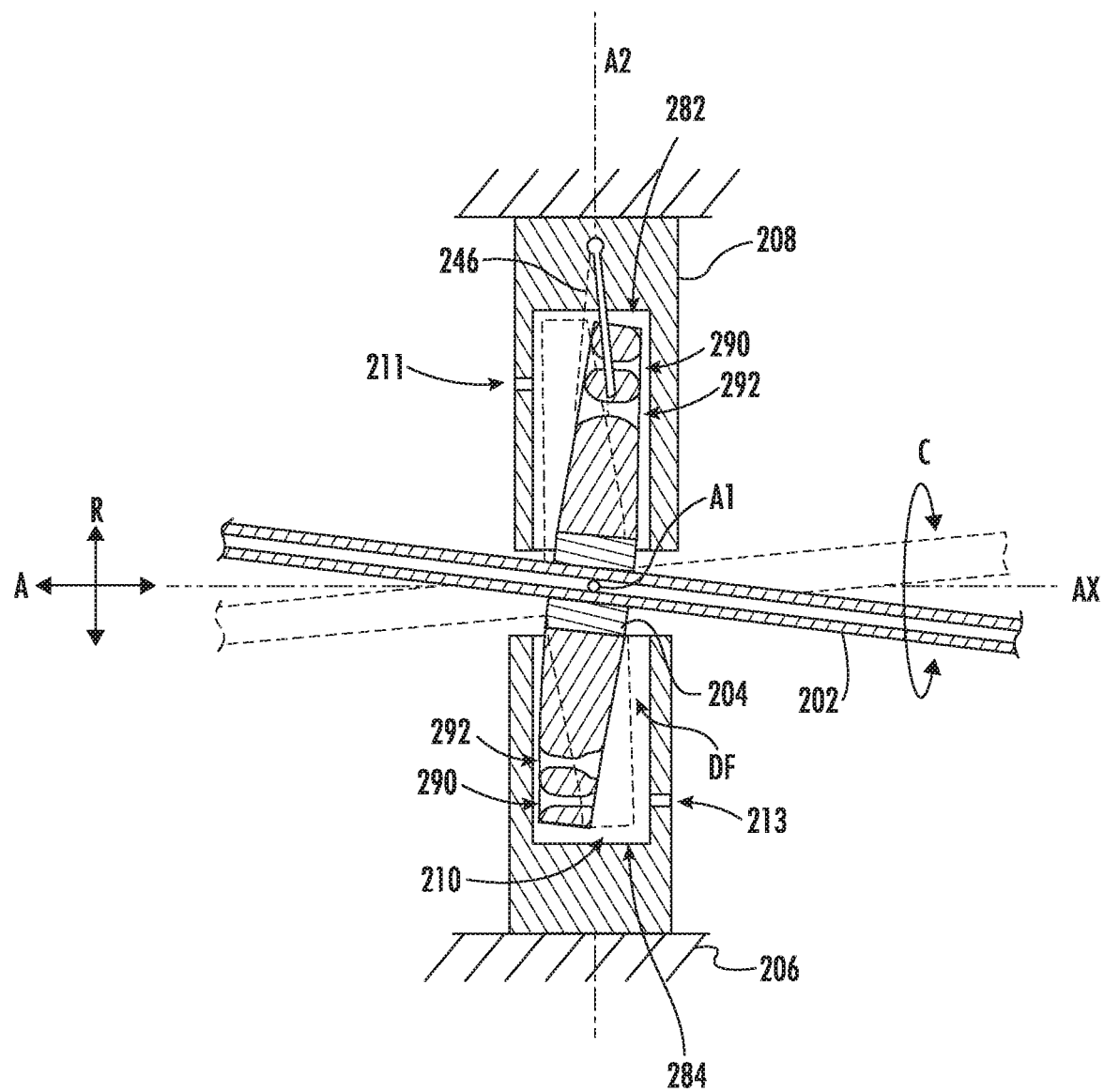
FIG. 5 provides a schematic view of yet another exemplary damping device in accordance with an exemplary embodiment of the present disclosure.

FIG. 5 provides a schematic view of yet another exemplary damping device 200 in accordance with an exemplary embodiment of the present disclosure. The exemplary damping device 200 of FIG. 5 is configured in a similar manner as the damping device of FIG. 2 and FIG. 3, and accordingly, the same or similar reference numerals refer to the same or similar parts. In contrast with the damping device of FIGS. 2 and 3, the damping device 200 of FIG. 5 dampens bending vibration by moving damping fluid DF through squeeze ports defined by the damping disc 220 as explained more fully below.

As shown in FIG. 5, the damping disc 220 is at least partially received within the chamber 210 and defines a plurality of squeeze ports. More particularly, for this embodiment, the damping disc 220 defines a plurality of outer squeeze ports 290 circumferentially spaced from one another about the axis of rotation AX. The damping disc 220 may also define a plurality of inner squeeze ports 292 circumferentially spaced from one another about the axis of rotation AX and disposed radially inward of the plurality of outer squeeze ports 290. In some embodiments, only a single ring of squeeze ports are defined by the damping disc 220. In other embodiments, more than two (2) rings of squeeze ports are defined by the damping disc 220.

In some embodiments, the squeeze ports 290, 292 extend through the damping disc 220 having a constant diameter (e.g., where the squeeze ports are circular openings) or height (e.g., where the squeeze ports are some other shape, such as rectangles). In some embodiments, similar to the squeeze ports 270, 272 of FIGS. 3 and 4, at least one of the plurality of squeeze ports 290, 292 are defined as a Venturi nozzle. That is, the squeeze port has a constricted section relative to a first end and a second end of the port, e.g., as shown in FIG. 5. With a port having a Venturi nozzle configuration, as the damping disc 220 is wobbled within the chamber 210, the damping fluid DF may be accelerated through the port depending on the wobble orientation or position of the damping disc 220, which may more efficiently squeeze the damping fluid DF through the port. Further, in some embodiments, the first end and second end of the ports 290, 292 may include radiused or rounded corners. Such rounded corners may facilitate damping fluid DF through the port, prevent turbulent flow within the chambers, and ultimately facilitate more efficient fluid dynamics of the damping fluid DF.

For this embodiment, as the damping disc 220 wobbles within the chamber 210 (e.g., between a first position shown in phantom lines and a second position shown in solid lines in FIG. 5), the damping disc 220 moves the damping fluid DF substantially along a direction parallel to the axis of rotation AX for damping bending vibration of the shaft 202. In this example, the direction parallel to the axis of rotation AX is the axial direction A. More particularly, when the damping disc 220 wobbles to the first position as viewed from the perspective of FIG. 5, the damping fluid DF within the chamber 210 is moved substantially along a direction parallel to the axis of rotation AX causing some of the damping fluid DF to pass or squeeze through the squeeze ports 290, 292 at the first end 282 of the chamber 210. The damping fluid DF that is squeezed through the squeeze ports 290, 292 at the first end 282 flows toward the first wall 212, e.g., along the axial direction A. Some of the damping fluid DF is compressed between the second face 224 of the damping disc 220 and the second wall 214 of the housing 208. Further, when the damping disc 220 wobbles to the first position as viewed from the perspective of FIG. 5, the damping fluid DF within the chamber 210 is moved substantially along a direction parallel to the axis of rotation AX causing some of the damping fluid DF to pass or squeeze through the squeeze ports 290, 292 at the second end 284 of the chamber 210. The damping fluid DF that is squeezed through the squeeze ports 290, 292 at the second end 284 flows toward the second wall 214, e.g., along the axial direction A. Some of the damping fluid DF is compressed between the first face 222 of the damping disc 220 and the first wall 212 of the housing 208.

Similarly, when the damping disc 220 wobbles to the second position as viewed from the perspective of FIG. 5, the damping fluid DF within the chamber 210 is moved substantially along a direction parallel to the axis of rotation AX causing some of the damping fluid DF to pass or squeeze through the squeeze ports 290, 292 at the first end 282 of the chamber 210. The damping fluid DF that is squeezed through the squeeze ports 290, 292 at the first end 282 flows toward the second wall 214, e.g., along the axial direction A. Some of the damping fluid DF is compressed between the first face 222 of the damping disc 220 and the first wall 212 of the housing 208. In addition, when the damping disc 220 wobbles to the second position as viewed from the perspective of FIG. 5, the damping fluid DF within the chamber 210 is moved substantially along a direction parallel to the axis of rotation AX causing some of the damping fluid DF to pass or squeeze through the squeeze ports 290, 292 at the second end 284 of the chamber 210. The damping fluid DF that is squeezed through the squeeze ports 290, 292 at the second end 284 flows toward the second wall 214, e.g., along the axial direction A. Some of the damping fluid DF is compressed between the second face 224 of the damping disc 220 and the second wall 214 of the housing 208.

Accordingly, as the damping disc 220 wobbles within the chamber 210, the energy from the bending vibration transmitted from the shaft 202 to the bearing 204 and to the damping disc 220 is absorbed by the damping fluid DF moved substantially along a direction parallel to the axis of rotation AX by the damping disc 220 and squeezed through the squeeze ports 290, 292. Consequently, the damping device 200 dampens the bending vibration emitted by the shaft 202. As further shown in FIG. 5, anti-rotation device 246 may constrain the spinning movement of the damping disc 220 about the axis of rotation AX invoked by tangential friction forces originating from bearing 204. Further, although not shown, the damping device 200 may include other features not shown in FIG. 3, such as e.g., the radial support assembly 250.

Figure 6:
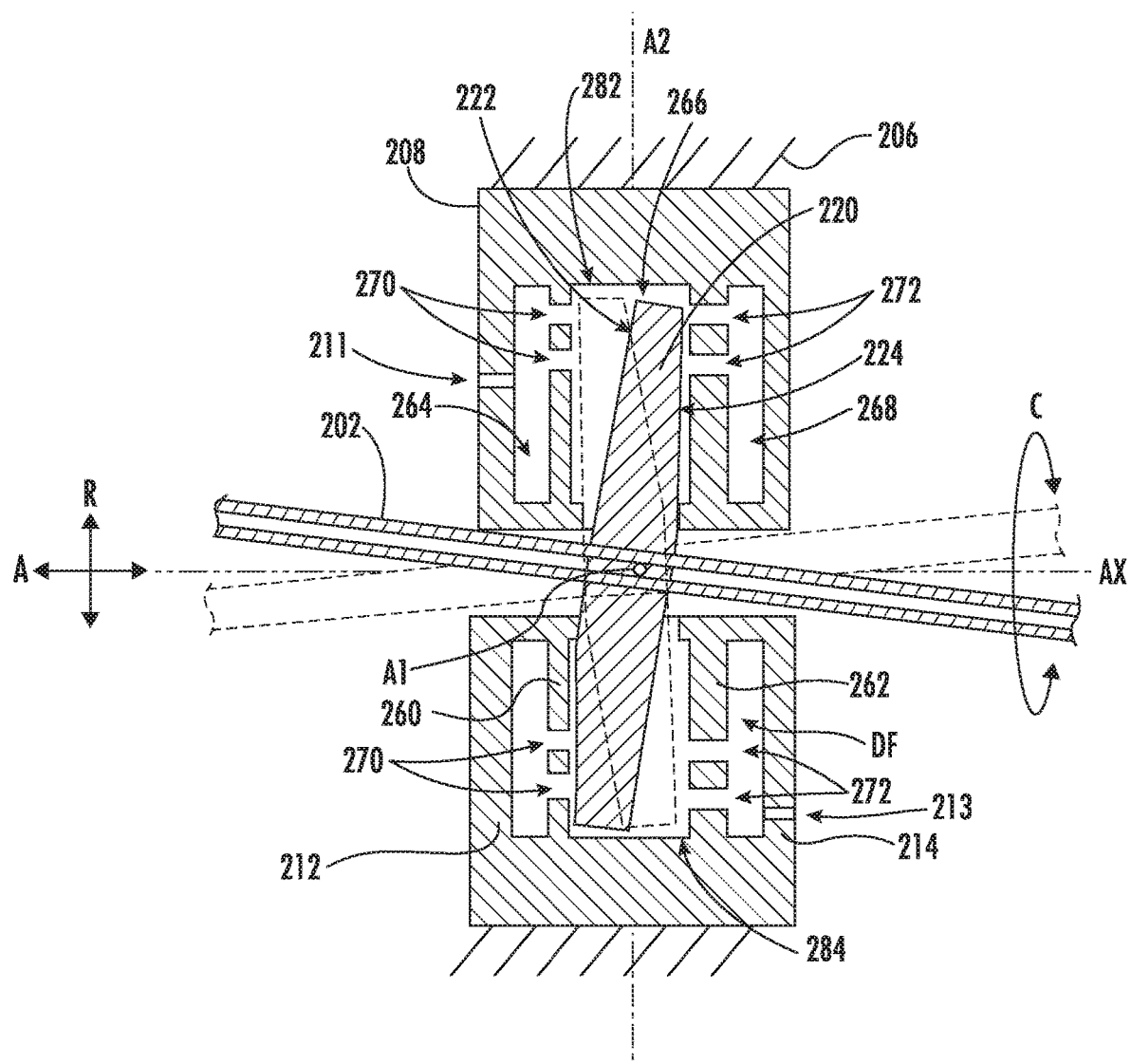
FIG. 6 provides a schematic view of a further exemplary damping device in accordance with an exemplary embodiment of the present disclosure.

FIG. 6 provides a schematic cross sectional view of a further exemplary damping device 200 in accordance with an exemplary embodiment of the present disclosure. The exemplary damping device 200 of FIG. 6 is configured in a similar manner as the damping device of FIG. 3, and accordingly, the same or similar reference numerals refer to the same or similar parts. In contrast with the damping device of FIG. 3, the damping disc 220 of the damping device 200 of FIG. 6 is not operatively coupled with a bearing. Rather, as shown in FIG. 6, the damping disc 220 is directly operatively coupled with the shaft 202.

For damping of bending vibration emitted by the shaft 202, the damping disc 220 wobbles within the main chamber 266 (e.g., between a first position shown in phantom lines and a second position shown in solid lines in FIG. 6). As this occurs, the damping disc 220 moves the damping fluid DF substantially along a direction parallel to the axis of rotation AX, e.g., in a manner as described above with reference to FIG. 3. Thus, the damping device 200 dampens the bending vibration of the shaft 202. In addition, for this embodiment, as the damping disc 220 is directly operatively coupled with the shaft 202, the damping disc 220 rotates in unison with the shaft 202 about the axis of rotation AX. As this occurs, the damping disc 220 moves the damping fluid DF about the circumferential direction C, particularly within the main chamber 266 of chamber 210. Accordingly, as the damping disc 220 wobbles (e.g., about the first axis A1 and the second axis A2) and rotates about the axis of rotation AX, the bending vibration transmitted from the shaft 202 to the damping disc 220 is absorbed by the damping fluid DF moved substantially along a direction parallel to the axis of rotation AX through the squeeze ports 270, 272 and along the circumferential direction C by the damping disc 220. Consequently, the damping device 200 dampens the bending vibration emitted by the shaft 202. Further, although not shown in FIG. 6, the damping device 200 may include other features not shown, such as e.g., the radial support assembly 250.

Figure 7:
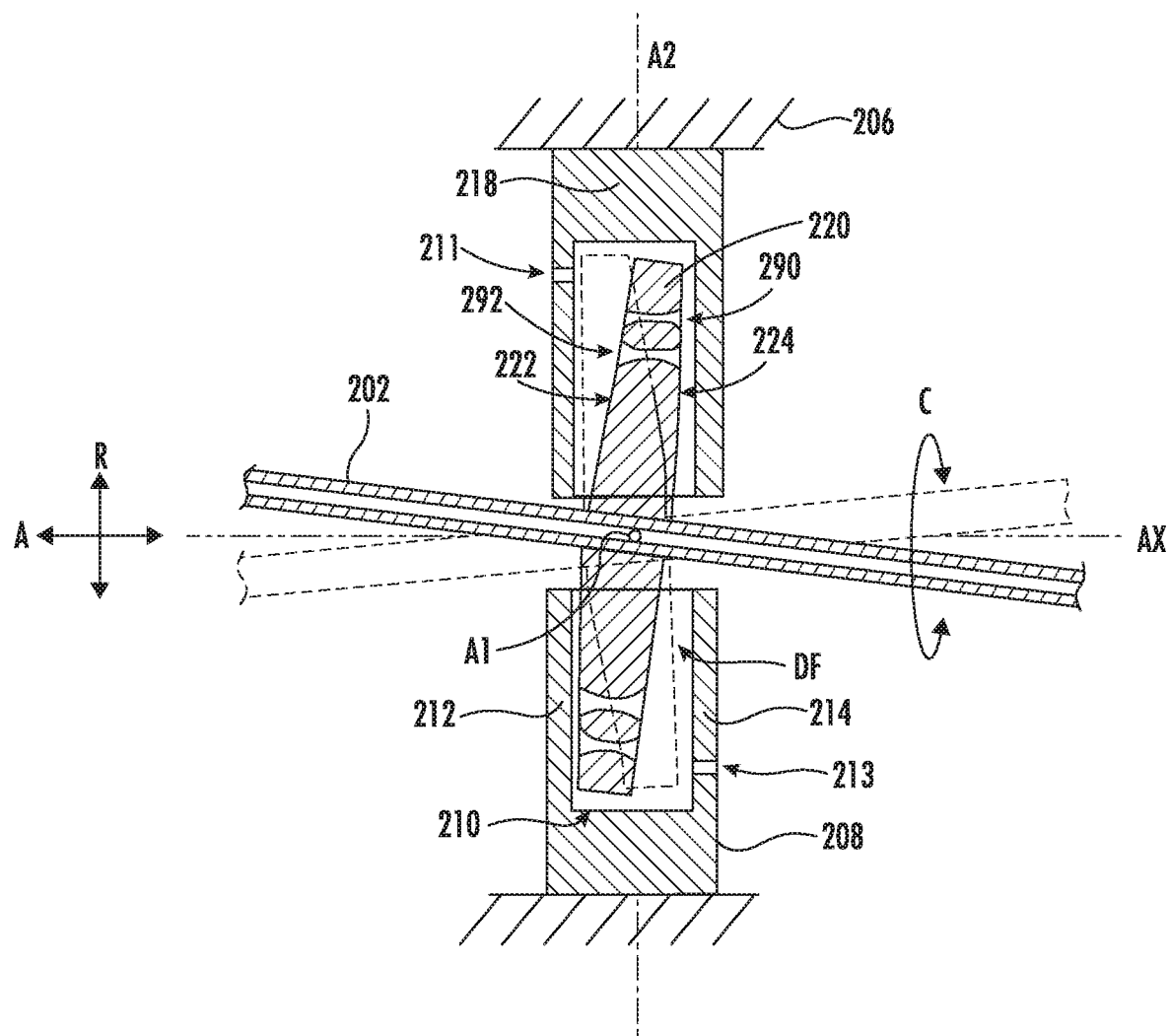
FIG. 7 provides a schematic view of a further exemplary damping device in accordance with an exemplary embodiment of the present disclosure.

FIG. 7 provides a schematic cross sectional view of a further exemplary damping device 200 in accordance with an exemplary embodiment of the present disclosure. The exemplary damping device 200 of FIG. 7 is configured in a similar manner as the damping device of FIG. 5, and accordingly, the same or similar reference numerals refer to the same or similar parts. In contrast with the damping device of FIG. 5, the damping disc 220 of the damping device 200 of FIG. 7 is not operatively coupled with a bearing. Rather, as shown in FIG. 7, the damping disc 220 is directly operatively coupled with the shaft 202.

For damping of bending vibration emitted by the shaft 202, the damping disc 220 wobbles within the main chamber 210 (e.g., between a first position shown in phantom lines and a second position shown in solid lines in FIG. 7). As this occurs, the damping disc 220 moves the damping fluid DF substantially along a direction parallel to the axis of rotation AX and damping fluid DF is squeezed through the squeeze ports 290, 292, e.g., in a manner as described above with reference to FIG. 5. Thus, the damping device 200 dampens the bending vibration of the shaft 202. In addition, for this embodiment, as the damping disc 220 is directly operatively coupled with the shaft 202, the damping disc 220 rotates in unison with the shaft 202 about the axis of rotation AX. As this occurs, the damping disc 220 moves the damping fluid DF about the circumferential direction C. Accordingly, as the damping disc 220 wobbles within the main chamber 210 (e.g., about the first axis A1 and the second axis A2) and rotates about the axis of rotation AX, the bending vibration transmitted from the shaft 202 to the damping disc 220 is absorbed by the damping fluid DF moved substantially along a direction parallel to the axis of rotation AX through the squeeze ports 290, 292 and along the circumferential direction C by the damping disc 220. Consequently, the damping device 200 dampens the bending vibration emitted by the shaft 202. Further, although not shown in FIG. 7, the damping device 200 may include other features not shown, such as e.g., the radial support assembly 250.

Figure 8:
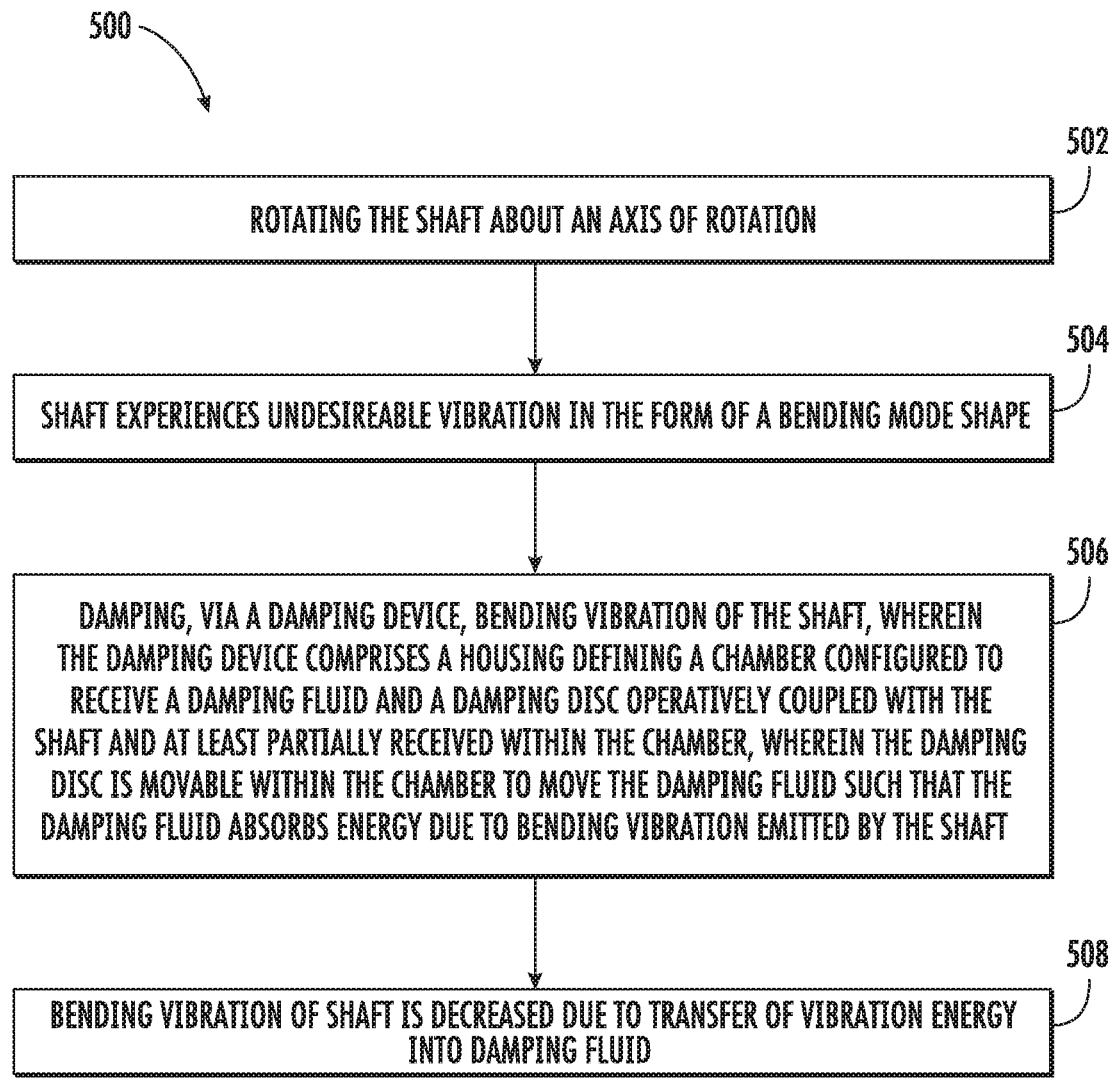
FIG. 8 provides a flow diagram of an exemplary method in accordance with an exemplary embodiment of the present disclosure.

FIG. 8 provides a flow diagram of an exemplary method (500) for damping bending vibration of a shaft according to an exemplary embodiment of the present disclosure. Some or all of the method (500) can be implemented by various components of the gas turbine engine 100 disclosed herein. The method may also be implemented by other turbomachines, drive shaft systems, shaft systems, etc. For instance, the method (500) may apply to or be incorporated with damping bending vibration of a tail rotor drive shaft of a rotary aerial vehicle.

At (502), the method (500) includes rotating the shaft about an axis of rotation. For instance, the shaft may be the gas generator shaft 160 or the power shaft 170 of the gas turbine engine 100 of FIG. 1. The shaft may be driven about the axis of rotation in a manner as described above (e.g., by the turbine extracting energy from the combustion gases and in turn rotating the shaft coupled thereto). The shaft may be driven about the axis of rotation in other suitable ways as well, such as e.g., by an electric drive motor.

At (504), in some instances, when the shaft is driven about its axis of rotation, the shaft may experience undesirable vibration in the form of a bending mode shape. For instance, the shaft may emit bending vibration as well as radial vibration when in the bending mode shape.

At (506), the method (500) includes damping, via a damping device, bending vibration of the shaft. In such implementations, the damping device includes a housing defining a chamber configured to receive a damping fluid. The damping device also includes a damping disc operatively coupled with the shaft and at least partially received within the chamber. Further, in such implementations, the damping disc is movable within the chamber to move the damping fluid such that the damping fluid absorbs energy due to bending vibration emitted by the shaft. For instance, the damping disc may move the damping fluid along a direction substantially parallel to the axis of rotation for damping bending vibration of the shaft. As used herein, "substantially parallel" to the axis of rotation is deemed within forty-five degrees (45°) of the axis of rotation.

At (508), as a result of damping at (506), the bending vibration of the shaft is decreased due to transfer of vibration energy into the damping fluid. Thus, the damping device dampens shaft vibration in the bending directions.

In some implementations, as noted previously, the damping disc is movable within the chamber in a wobbling motion. That is, in some implementations, the damping disc is configured to wobble within the chamber about a first axis defined by the damping device orthogonal to the axis of rotation and a second axis defined by the damping device orthogonal to the first axis and the axis of rotation. As the damping disc wobbles, the damping disc moves the damping fluid within the chamber of the housing along a direction substantially parallel to the axis of rotation. Movement of the damping fluid along such a direction may cause the damping fluid to become compressed or squeezed between the damping disc and one or more of the walls of the housing, may cause the damping fluid to squeeze through one or more squeeze ports defined by partition walls of the chamber, and/or may cause the damping fluid to squeeze through one or more squeeze ports defined by the damping disc. In this way, energy from the bending vibration transmitted from the shaft to the damping disc (either directly or through a bearing) may be absorbed by the damping fluid, and thus, the bending vibration of the shaft may be dampened.

In some implementations, the method (500) further includes receiving shaft state data indicative of vibration of the shaft. For instance, suppose the shaft is one of the gas generator shaft 160 or the power shaft 170 of the gas turbine engine 100 and suppose the damping device 200 is one of the exemplary damping devices disclosed herein. In such implementations, one or both of the sensors 195, 196 may sense shaft state data of one or both of the shafts 160, 170 that is indicative of the vibration of one or both of the shafts 160, 170. Shaft state data may include various parameters, such as e.g., shaft speed, shaft acceleration, shaft displacement from its resting state, etc. Multiple sensors may measure shaft state data along the length of the shaft. The shaft state data may be received by the controller 198, e.g., as analog or digital signals.

Further, in such implementations, the method (500) may further include determining a mode shape of the shaft based at least in part on the shaft state data. For instance, continuing with the example above, upon receiving the shaft state data, the controller 198 may determine the mode shape of the shaft. For example, the controller 198 may include one or more mode shape models, formulas, look-up tables, etc. that can be used to calculate the mode shape of the shaft based on the shaft state data received.

Moreover, in such implementations, the method (500) may include selectively adjusting the damping fluid flow and/or the pressure of the damping fluid within the chamber based at least in part on the mode shape of the shaft. In this way, the damping response of the damping device is responsive to the actual mode shape of the shaft. For instance, upon determining the mode shape of the shaft based on the received shaft state data, the volume of damping fluid within the chamber may be adjusted such that the damping disc, damping fluid, and potentially other damping components may collectively provide an optimal damping response to the particular mode shape of the shaft. As one example, depending on the damping response to the determined mode shape, the controller 198 may activate or send control signals to a control component of the damping device 200 to selectively adjust the volume of damping fluid within the chamber 210. Depending on the volume of damping fluid within the chamber 210, the wobble frequency of the damping disc, the range of motion of the damping disc, the acceleration of the damping fluid through the squeeze ports, etc. may be adjusted such that an optimal damping response is achieved.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine, comprising:
    a shaft rotatable about an axis of rotation;
    a support structure; and
    a damping device positioned between the support structure and the shaft, the damping device comprising:
        a housing defining a chamber configured to receive a damping fluid; and
        a damping disc operatively coupled with the shaft and at least partially received within the chamber, wherein the damping disc is configured to wobble within the chamber about a first axis orthogonal to the axis of rotation and a second axis orthogonal to the first axis and the axis of rotation to move the damping fluid such that the damping fluid absorbs bending vibration emitted by the shaft;
        wherein the turbomachine defines a radial direction extending orthogonal to and from the axis of rotation, and wherein the damping disc has a thickness defined between a first face and a second face opposing the first face, and wherein the damping disc comprises a hub portion defining a pass-through aperture through which the shaft extends, and wherein the damping disc extends outward from the hub portion to an outer periphery along the radial direction, and wherein the thickness of the damping disc gradually changes from the hub portion to the outer periphery.

2. The turbomachine of claim 1, wherein the damping disc moves the damping fluid substantially along a direction parallel to the axis of rotation for damping bending vibration of the shaft.

3. The turbomachine of claim 1, wherein the damping device further comprises:
    an anti-rotation device operatively coupling the damping disc with at least one of the housing and the support structure, wherein the anti-rotation device is configured to constrain a range of motion of the damping disc within the chamber.

4. The turbomachine of claim 3, wherein the damping disc is configured to wobble within the chamber, and wherein the anti-rotation device is configured to constrain the range of motion of the damping disc about the axis of rotation.

5. The turbomachine of claim 1, wherein the damping device further comprises:
    a radial support assembly configured to constrain radial deflection of the shaft, the radial support assembly including a shaft bearing assembly that supports the shaft, the shaft bearing assembly has a bearing element and a coupling arm coupling an outer race of the shaft bearing assembly to a support structure.

6. The turbomachine of claim 5, wherein the damping device further comprises:
    a radial squeeze film damper for damping radial vibration of the shaft.

7. The turbomachine of claim 1, wherein the damping disc has a first face and a second face opposing the first face, and wherein the housing extends between a first wall and a second wall opposing the first wall, and wherein the housing comprises a first partition wall positioned between the first wall and the first face of the damping disc and a second partition wall positioned between the second wall and the second face of the damping disc, and wherein a first chamber is defined between the first wall and the first partition wall, a main chamber is defined between the first partition wall and the second partition wall, and a second chamber is defined between the second partition wall and the second wall, and wherein the first chamber is in fluid communication with the main chamber and the second chamber is in fluid communication with the main chamber.

8. The turbomachine of claim 7, wherein the first partition wall defines a plurality of squeeze ports circumferentially spaced from one another about the axis of rotation and the second partition wall defines a plurality of squeeze ports circumferentially spaced from one another about the axis of rotation, wherein the plurality of squeeze ports defined by the first partition wall provide fluid communication between the first chamber and the main chamber and the plurality of squeeze ports defined by the second partition wall provide fluid communication between the second chamber and the main chamber.

9. The turbomachine of claim 8, wherein at least one of the plurality of squeeze ports defined by the first partition wall or at least one of the plurality of squeeze ports defined by the second partition wall are defined as a Venturi nozzle.

10. The turbomachine of claim 1, wherein the damping disc defines a plurality of squeeze ports.

11. The turbomachine of claim 1, wherein the damping disc defines a plurality of outer squeeze ports circumferentially spaced from one another about the axis of rotation and wherein the damping disc defines a plurality of inner squeeze ports circumferentially spaced from one another about the axis of rotation and disposed radially inward of the plurality of outer squeeze ports.

12. A method for damping bending vibration of a shaft, the method comprising:
    rotating the shaft about an axis of rotation, wherein the shaft defines a radial direction extending orthogonal to and from the axis of rotation; and
    damping, via a damping device, bending vibration of the shaft, wherein the damping device comprises a housing defining a chamber configured to receive a damping fluid and a damping disc operatively coupled with the shaft and at least partially received within the chamber, wherein the damping disc wobbles within the chamber about a first axis orthogonal to the axis of rotation and a second axis orthogonal to the first axis and the axis of rotation to move the damping fluid such that the damping fluid absorbs energy due to bending vibration emitted by the shaft, and wherein the damping disc has a thickness defined between a first face and a second face opposing the first face, and wherein the damping disc comprises a hub portion defining a pass-through aperture through which the shaft extends, and wherein the damping disc extends outward from the hub portion to an outer periphery along the radial direction, and wherein the thickness of the damping disc gradually changes from the hub portion to the outer periphery.

13. The method of claim 12, further comprising:
receiving shaft state data indicative of vibration of the shaft;
determining a mode shape of the shaft based at least in part on the shaft state data; and
selectively adjusting at least one of a damping fluid flow and a pressure of the damping fluid within the chamber based at least in part on the mode shape of the shaft.

14. A damping device for damping bending vibration of a shaft rotatable about an axis of rotation, the damping device coupled with a support structure, the damping device comprising:

a housing defining a chamber configured to receive a damping fluid; and
a damping disc operatively coupled with the shaft and at least partially received within the chamber, wherein the damping disc is configured to wobble within the chamber about a first axis orthogonal to the axis of rotation and a second axis orthogonal to the first axis and the axis of rotation to move the damping fluid along a direction substantially parallel to the axis of rotation for damping bending vibration of the shaft,
wherein the housing comprises an inlet port through which the damping fluid enters the chamber and an outlet port through which the damping fluid exits the chamber, and wherein the chamber is in fluid communication with a circulation system configured for circulating the damping fluid into the chamber through the inlet port and out of the chamber through the exit when the shaft is rotated about the axis of rotation.

15. The damping device of claim 14, wherein the shaft is a tail rotor drive shaft of a rotary aerial vehicle.

16. The damping device of claim 14, wherein a bearing is positioned between and operatively couples the damping disc and the shaft.

* * * * *